Nov. 10, 1964 R. M. LAMB 3,156,069
MAPLE SAP COLLECTING SYSTEM
Filed Nov. 13, 1962 3 Sheets-Sheet 2

*INVENTOR*
ROBERT M. LAMB

BY
ATTORNEY

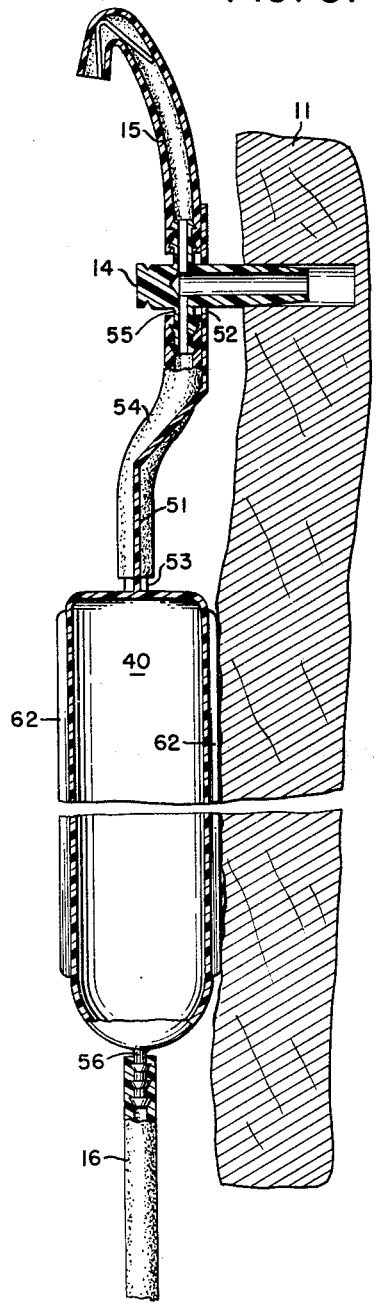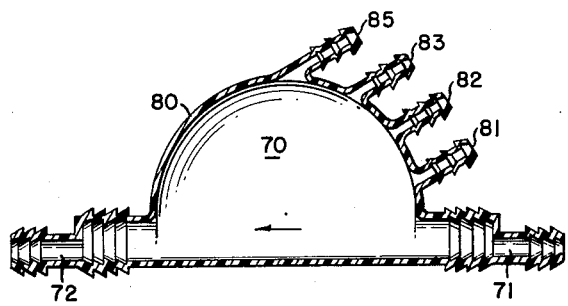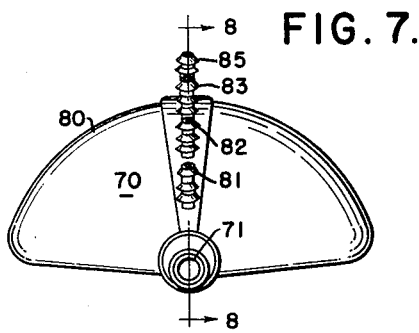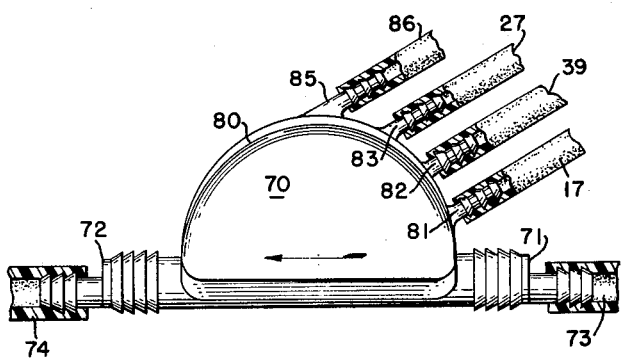

3,156,069
MAPLE SAP COLLECTING SYSTEM
Robert M. Lamb, Onondaga County, N.Y.
(915 Oswego St., Liverpool, N.Y.)
Filed Nov. 13, 1962, Ser. No. 236,988
8 Claims. (Cl. 47—51)

This invention relates to the collection and transportation of maple sap from maple sugar trees in which flexible tubing, conventionally formed of plastic material, is used to convey the sap from spiles set in tree tapholes by gravity flow to a storage tank or to the evaporator house.

Systems of this kind invariably contain gases along with the flowing sap. Air fills the system at the start of a new harvest. Certain volatile tree sap gases evolve, or bubble, from the sap at the taphole and along the run. Since the tree sap gases continue to be produced as long as there is a sap flow from a tree, it is necessary for the most efficient sap production that the system be adequately vented, not only at the taphole, but also along the run to the storage tank or evaporator house at points where gas pockets sufficient to form a vapor lock or to retard the flow may occur.

For a more complete explanation of the known system of this type, reference is made to "The Use of Plastic Tubing for the Collecting and Transporting of Maple Sap," by C. O. Willits and Lloyd Sipple, a November 1961 publication of the Agriculture Research Service, United States Department of Agriculture (A.R.S. 73–35).

At times of freezing nights, or other cold snaps, one difficulty arises in systems of this type due to the formation of an ice plug of frozen sap in the drop line tube or in the lateral tube or trunk line tube leading from the spile. The drop line tubes are connected air tight with the spiles and hang downwardly. At their lower outlet ends they are connected air tight to the trunk line tube. The lateral and trunk line tubes lie horizontally, generally supported on the terrain. Occasionally such an ice plug will remain for some time during flow of sap, hindering the flow and causing sap to rise in and spill out of the vent tube on the spile, at least for the interval required for atmospheric warming of the frozen tube sufficiently to melt the ice near the wall of the tube and permit the sap to by-pass the plug. The present invention prevents spillage of sap from the vent tube.

Another difficulty arises at junctions, such, for example, as the junctions used in connecting a drop line tube, or several drop line tubes, to a lateral tube, or in connecting lateral tubes to a main line tube. It is desirable to provide vents at such junctions, especially at locations where gas locks may occur. Occasionally, in the usual system, sap will enter and stop free gas passage through the vent, thus defeating the purpose for which the vent is provided. The present invention also corrects this problem.

The system also provides a container of ample volume at points where the vents are located with the vent exit at the upper portion of the container, preferably in its top, and provides for a free fall of the sap in a small stream, usually as droplets, in the container, thus to create an ideal environment for the evolution of the tree sap gases since the gas bubbles which emerge from the sap are free to expand and break. There is no build-up of back pressure or resistance to the sap flow at the taphole with a consequent lessening of flow.

For a description of the invention in detail, reference is made to the accompanying drawing in which:

FIGURE 5 is a view showing the container in its use position on a tree, the portion of the container shown in section corresponding to a section on line 5—5 of FIGURE 2;

FIGURE 6 is a side elevation of a junction for connecting drop line tubes to a lateral or main line tube;

FIGURE 7 is an end elevation of the junction of FIGURE 6; and

FIGURE 8 is a section on line 8—8 of FIGURE 7.

Figure 1:
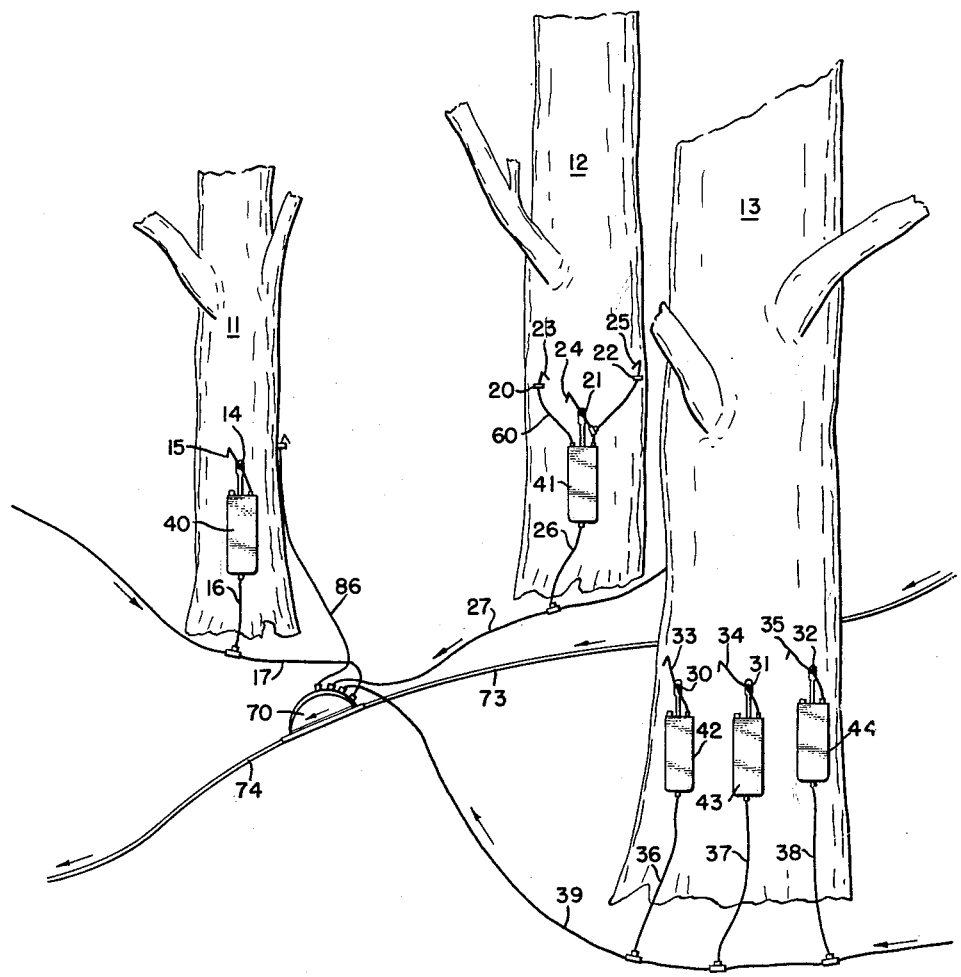
FIGURE 1 is a schematic showing of a system employing the invention, illustrating different hookups on different trees.
Figure 2:
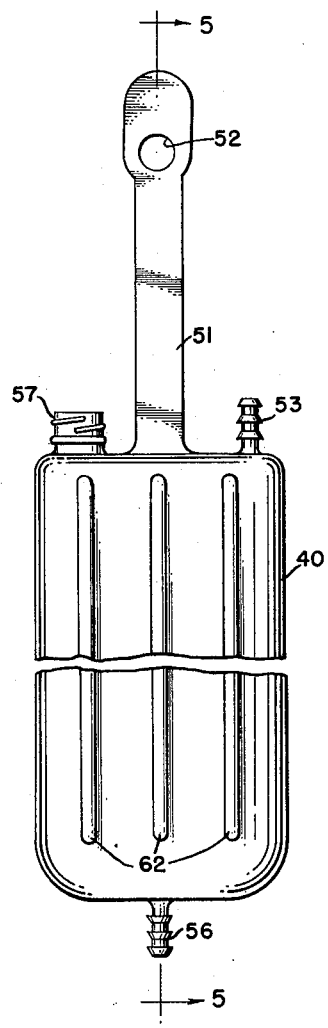
FIGURE 2 is an elevation of a container for receiving and holding sap from a spile during the interval a tube from this spile may be frozen.
Figure 3:
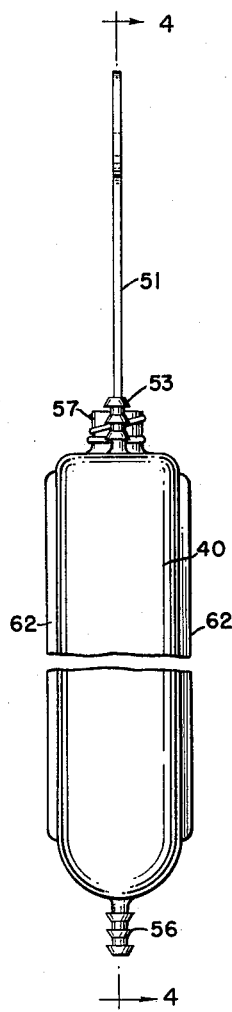
FIGURE 3 is a side elevation of the container.
Figure 4:
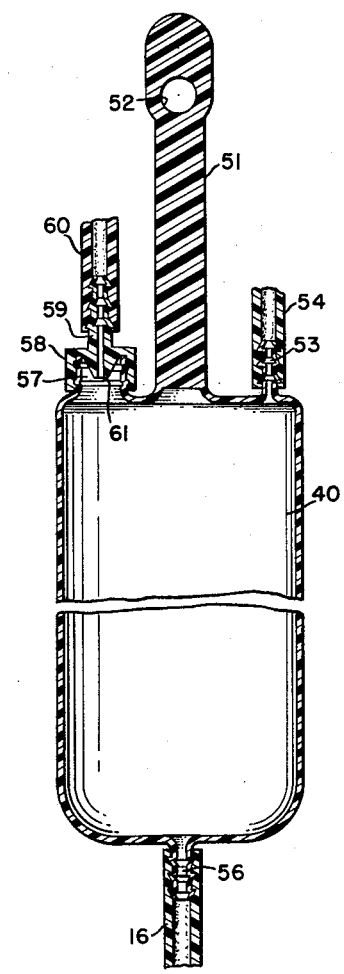
FIGURE 4 is a section corresponding to a section on line 4—4 of FIGURE 3 with certain details added to illustrate a different hookup.

A maple sugar bush is illustrated in FIGURE 1 showing three typical trees 11, 12 and 13, with different arrangements of taps and hookups. Tree 11 has a single spile 14 of a type shown in FIGURE 2 of the A.R.S. 73–35 publication mentioned above provided with a vent tube 15 having a reverse bend at its upper end to direct the vent outlet downwardly and provided with a flexible drop line tube 16 leading into a flexible lateral tube 17 which lies horizontally. Tree 12 has several spiles 20, 21 and 22 provided with similar vent tubes 23, 24 and 25, and one drop line tube 26 leading into lateral tube 27. Tree 13 has several spiles 30, 31 and 32 provided with similar vent tubes 33, 34 and 35 and several drop line tubes 36, 37 and 38, one for each spile, all leading into lateral tube 39.

Adjacent spile 14 of tree 11, a container 40 is provided. The container 41 on tree 12 and containers 42, 43 and 44 on tree 13 are similar to container 40.

FIGURES 2, 3, 4 and 5 illustrate container 40 in detail. It is preferably molded from a plastic material to form a fluid tight, one piece structure and is provided with an integral hanger ear 51 having an aperture 52 therein of such size as to receive the tap hole segment of the spile, as illustrated in FIGURE 5 for example, thus to provide a convenient means for supporting the container on the tree and to assure its location below and adjacent the spile, and to maintain it in its operative position throughout the season the spile remains in place in the tap hole. Ear 51 is sufficiently flexible to permit installing the container in the manner illustrated in FIGURE 5. The container is provided in its upper portion, preferably in its top, with a nipple 53 for receiving a short piece of tubing 54, as a means for connecting the downwardly projecting spile tubulation 55, or sap outlet of the spile, fluid tight to the entrance port of the container for flow of sap into the container, the upwardly projecting spile tubulation providing the vent part being connected to the vent tube 15 in the usual manner.

The lower portion of the container is provided with a nipple 56 for connecting the inlet end of flexible drop line tube 16 fluid tight to the container for flow of sap therefrom by gravity.

A port 57, which may be closed with a conventional cap (not illustrated), is provided in the top of the container for convenience in cleaning. Also the cap may be replaced by an adapter 58 (see FIGURE 4) having a nipple 59 for receiving a short piece of tube to connect fluid tight with the sap outlet of another spile (tube 60 on tree 12 for example). An integral drip lip 61 is projected downwardly from the adapter. Container 40 provides ample volume to prevent back pressure. Also the sap enters the container in a small stream with a rapid evolution of the gases which then by-pass the sap in tube 54 and exit through vent tube 15.

If the drop line tube or lateral tube freezes, and remains frozen during an interval of sap flow, the container provides means for automatically receiving and holding sap flowing from the spile during such interval that the ice plug remains. As the atmosphere warms, the surface of the ice plug adjacent the tube wall thaws and warmer sap from the tree also flows into the container to aid the thawing. This flow of sap speeds up the thawing rate and the flow through the tube soon becomes normal. If desired, the container may also be provided with a number of integral ribs 62 to increase the surface area and assist the atmospheric warming of the container to thaw any ice it may contain.

Sap from the tubes 17, 27 and 39 flows into a flexible, horizontally lying trunk line tube through a junction 70. The junction, preferably molded from a plastic material as a fluid tight one piece structure, is of special design to provide a container of ample volume and to provide venting through an upwardly extending vent tube with lessened dangers of sap entering the vent. FIGURES 6, 7 and 8 illustrate such a junction in detail.

The junction is provided with a nipple 71, providing an entrance port, and a nipple 72, providing an exit port, for connecting to sections 73 and 74 of the trunk line tube for transporting the sap to a storage tank. These nipples are preferably formed to receive different size tubes, as illustrated. In event the larger size tube is used, the smaller section of the nipple is removed, as by sawing.

The junction is designed to sit on the ground in an upright position and is provided with a raised roof portion 80. Entrance nipples 81, 82 and 83 are provided in the roof portion for connecting fluid tight to the outlet ends of the tubes 17, 39 and 27, respectively, to empty sap from the tubes in small streams into the junction. A nipple 85 is also provided in the roof portion. This nipple receives the lower end of an upwardly extending vent tube 86 provided with a usual type bend at its upper end, thus to connect the vent tube to the raised roof portion. Also nipples 81, 82 and 83 are located in the raised roof portion at a high point but preferably below the nipple 85. Thus the sap from tubes 17, 39 or 27 enters in small streams and rapidly evolves any tree sap gases that may be present, and the sap can not pass over the exit of the vent nipple 85 and plug it. Due to the raised roof arrangement of the junction and the placement of the vent tube nipple at a high point, the probability of sap filling the junction sufficiently to rise in and plug the vent tube is substantially eliminated.

Although the junction is shown as provided with three entrance nipples 81, 82 and 83, only one may be required in certain hookups, as for example in a location where there is but one container and one drop line or lateral tube leading into the union. In this event junctions may be provided with a lesser number of nipples for receiving the tubes, or certain of the nipples may be plugged. In any event the nipple in the raised roof portion for receiving the vent tube, and one or more entrance nipples will always be present.

FIGURE 1 shows vent tube 86 hung on tree 11 as a convenient support.

I claim:

1. A maple sap collecting system comprising a spile vented at the upper end, fluid tight sap-conducting means connected with said spile for withdrawal of sap therefrom by gravity flow, a sap container connected with said sap-conducting means to receive the sap from said spile, means for supporting said container at a location below and adjacent the spile, a downwardly extending, flexible tube connected fluid tight with said container for withdrawal of sap by gravity flow, a vented sap-receiving junction connected fluid tight with said downwardly extending, flexible tube to receive the sap from said container, and a flexible tube connected fluid tight with said junction for withdrawal of the sap therefrom by gravity flow.

2. A system as in claim 1 wherein said container is integrally provided with an apertured hanger ear, said aperture being adapted to receive said spile as the means for supporting the container.

3. A system as in claim 1 wherein said sap container is provided with integral ribs to assist in atmospheric warming of the container.

4. A maple sap collecting system comprising a spile vented at its upper end, a downwardly extending, flexible tube connected fluid tight with said spile for withdrawal of sap therefrom by gravity flow, a vented sap-receiving junction connected fluid tight with said downwardly extending, flexible tube to receive the sap from said spile, and a flexible tube connected fluid tight with said junction for withdrawal of the sap therefrom by gravity flow.

5. The system as in claim 4 wherein said junction is provided with a raised roof portion having an upright tube connected to the raised roof portion to provide the vent, whereby sap does not fill the junction sufficiently to rise in said vent tube.

6. The system as in claim 5 wherein the connection of the junction with said downwardly extending, flexible tube is positioned in the raised roof portion below the vent tube connection, whereby sap entering the junction from said downwardly extending, flexible tube does not pass over the entrance to the vent tube and plug it.

7. A maple sap collecting system comprising a spile vented at its upper end, a flexible tube connected fluid tight with said spile for withdrawal of sap therefrom by gravity flow, a sap container connected fluid tight with said flexible tube for receiving the sap from said spile, an apertured hanger ear integral with said container, the aperture being adapted to receive said spile for supporting said container at a location below and adjacent the spile, a downwardly extending, flexible tube connected fluid tight with said container for withdrawal of sap therefrom by gravity flow, a vented sap-receiving junction connected fluid tight with said downwardly extending, flexible tube to receive the sap from said container, and a flexible tube connected fluid tight with said junction for withdrawal of the sap therefrom by gravity flow.

8. The system of claim 1 wherein said sap-receiving junction is provided with a raised roof portion having an upright tube connected to the raised roof portion to provide the vent, whereby sap does not fill the junction sufficiently to rise in the vent tube, and wherein the connection of the junction with said downwardly extending, flexible tube is positioned in the raised roof portion below the vent tube connection, whereby sap entering the junction from said downwardly extending, flexible tube does not pass over the entrance to the vent tube and plug it.

References Cited by the Examiner

UNITED STATES PATENTS

| 107,407 | 9/70 | Post | 47—50 |
| 3,057,115 | 10/62 | Bilanin | 47—52 |

FOREIGN PATENTS 422,486  11/10  France.

ABRAHAM G. STONE, *Primary Examiner.*